United States Patent [19]

Vellmer

[11] Patent Number: 5,692,813
[45] Date of Patent: Dec. 2, 1997

[54] ELECTROHYDRAULIC PRESSURE CONTROL DEVICE

[75] Inventor: Arnim Vellmer, Frankfurt, Germany

[73] Assignee: ITT Automotive Europe GmbH, Germany

[21] Appl. No.: 596,323

[22] PCT Filed: Aug. 5, 1994

[86] PCT No.: PCT/EP94/02602

§ 371 Date: Apr. 23, 1996

§ 102(e) Date: Apr. 23, 1996

[87] PCT Pub. No.: WO95/05301

PCT Pub. Date: Feb. 23, 1995

[30] Foreign Application Priority Data

Aug. 19, 1993 [DE] Germany .................. 43 27 887.6

[51] Int. Cl.⁶ ........................................... B60T 8/36
[52] U.S. Cl. .............. 303/119.2; 137/884; 137/596.17; 137/377
[58] Field of Search .............. 303/119.2, 119.1; 439/76, 34, 723; 335/202, 219, 278; 137/884, 596.17, 377, 382

[56] References Cited

U.S. PATENT DOCUMENTS

| | | | |
|---|---|---|---|
| 5,040,853 | 8/1991 | Burgdorf et al. | 303/119.2 |
| 5,275,478 | 1/1994 | Schmitt et al. | 303/119.2 |
| 5,462,344 | 10/1995 | Jakob et al. | 303/119.2 |
| 5,520,447 | 5/1996 | Burgdorf et al. | 303/119.2 |

FOREIGN PATENT DOCUMENTS

| | | |
|---|---|---|
| 0373551 | 6/1990 | European Pat. Off. . |
| 0499670 | 8/1992 | European Pat. Off. . |
| 0519736 | 12/1992 | European Pat. Off. . |
| 0539770 | 5/1993 | European Pat. Off. . |
| 3813138 | 11/1989 | Germany . |
| 3813139 | 11/1989 | Germany . |
| 4001017 | 7/1991 | Germany . |
| 4018179 | 12/1991 | Germany . |
| 4118834 | 12/1992 | Germany . |
| 4135745 | 5/1993 | Germany . |
| 4140961 | 6/1993 | Germany . |
| 4232205 | 3/1994 | Germany . |
| WO8910286 | 11/1989 | WIPO . |
| WO9208630 | 5/1992 | WIPO . |
| WO9212878 | 8/1992 | WIPO . |

*Primary Examiner*—Lee W. Young
*Attorney, Agent, or Firm*—J. Gordon Lewis; Thomas N. Twomey

[57] ABSTRACT

The present invention relates to a pressure control device including a homogeneous assembly of lid, frame and cover (1, 3, 4, 4') in which the carrier element (2) and the conducting paths (10) are injection-molded. Also, all apertures (6) and projections (8) or recesses can be made in one working operation during manufacture of the lid. Closure of the frame (3) is possible either by a cover (4) that is retained by foil hinges (15) on the frame (3) or by a separate cover (4') which is positively engaged on the frame of the lid (1) by locking hooks.

4 Claims, 1 Drawing Sheet

ELECTROHYDRAULIC PRESSURE CONTROL DEVICE

The present invention relates to an electrohydraulic pressure control device, in particular a braking pressure control device.

An electrohydraulic pressure control device of the generic type is disclosed as an example in international publication No. WO 92/12878, wherein, in addition to the sufficiently known modular construction of the valve accommodating member, the lid is subdivided by a plate-shaped carrier element in order to accommodate component parts of an electronic controller, for example, conducting paths, IC components, on the one hand, and to provide the electrical connection between the electronic controller components and the contact elements projecting from the solenoid valves, on the other hand. The lid along with the coils of the solenoid valves is slipped on the valve domes of the valve accommodating member, and plug contacts engage into each other for making the electrical connection between the contact elements and the electronic or electric components integrated in the lid. For the attachment of the coils to the carrier element, elastic mounting means, for example, springs, are used, or the coils are embedded in an elastic shaped member. The positioning and the fastening of the controller component parts and the coils shall be simplified to achieve a compactness of the assembly and a design of the lid which is favorable with respect to an automatic manufacture (in conformity with the demands of automation).

Thus, an object of the present invention is to construct the pressure control device known from the previously mentioned state of the art such as to provide an easily accessible compact and functionally optimized assembly of the coils and the carrier element and the controller component parts, permitting them to be integrated in the cover and tested as easily as possible, and varying heat expansions of the component parts shall be absorbed with least possible tension.

According to the present invention, this object is achieved by the characterizing features. It is proposed that the top side of the lid forms the carrier element which is confined by a frame that can be closed by a cover after completed accommodation of the parts.

Further features, advantages and possible applications can be taken from the following description of an embodiment.

FIG. 1 shows the preferred embodiment.
FIG. 2 shows a modification of FIG. 1.

DETAILED DESCRIPTION OF A PREFERRED EMBODIMENT

Figure 1:
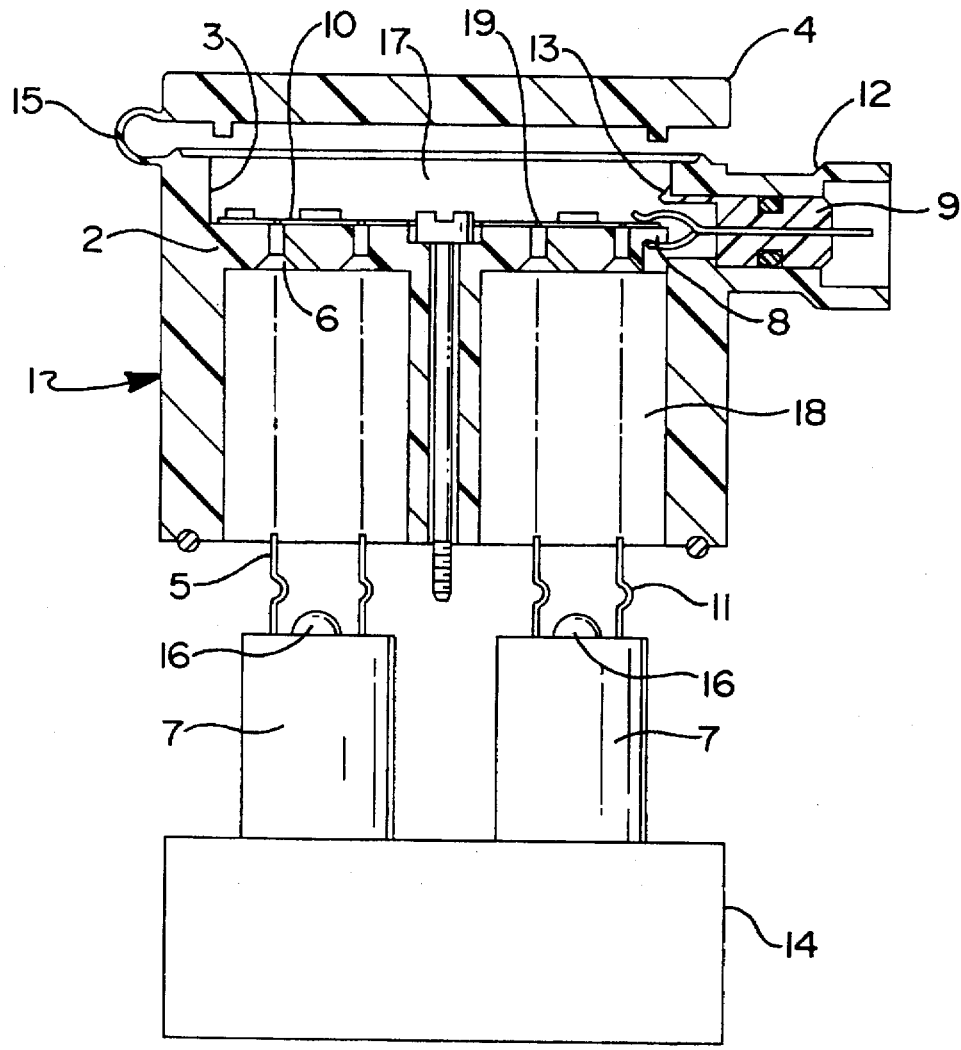

FIG. 1 shows a lateral view of the pressure control device according to the present invention with a sketch of the basic components. In a first embodiment, the pressure control device includes a substantially rectangular lid 1, shown in a profiled cross-section, comprising a carrier element 2 with a plurality of electric conducting paths 10 and a cover 4 that is placed on top on a frame 3 and is secured by plastic film hinges 15 formed integral with cover 4 and frame 3. Frame 3 defines a chamber divided into an upper portion 17 and a lower portion 18 by carrier element 2. Cover 4 fits over and closes chamber upper portion 17.

Figure 2:
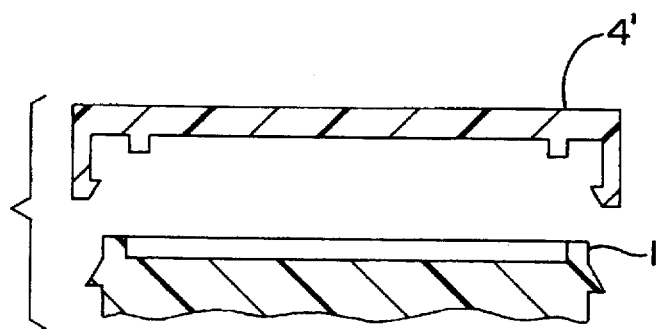

Another alternative embodiment of the frame cover is shown in FIG. 2. The cover 4' can be engaged positively into the rim of the frame 3 by means of locking hooks.

Regardless of the chosen individual consideration of the two design variants of a frame-type cover, the carrier element 2 is provided as a frame-type plate which is mounted or covered substantially horizontally over the contact elements 5 of coils 7. The frame-type plate has on its bottom side apertures 6 enlarged like a funnel to facilitate the insertion of the contact elements 5. Favorably, the electric conducting paths 10 are embedded in the carrier element 2 in hot-stamping operations (copper foil stamping method). A section of the contact elements 5 has an offset 11 providing an elastic attachment to the carrier element 2. The electric conducting paths 10 extend on the carrier element 2 until an area shaped as a projection 8 at which an electric plug 9 makes catch. Electric conducting paths 10 have a plurality of apertures 19 aligned with apertures 6 to receive contact elements 5. The electric plug 9 is provided as an adapter plug connector and is slipped with its tab-shaped contacts on the projection 8. The plug housing of the adapter plug connector is sealed in a plug retainer 12, formed in the lid 1, and attached in the frame/lid area by locking hooks 13. The block-type valve accommodating member 14 is made of steel or light metal and has valve domes 16. Coils 7 mounted on the carrier element 2 are positioned on top of the valve domes 16 which are arranged in two parallel rows. Because the carrier element 2 is provided as a printed-circuit board, favorably, the electric plug connection coupled to the conducting paths 10 can be formed as an homogeneous component part of the carrier element 2 or the lid 1 for the connection of a peripheral bunch of cables. The contact elements 5 of the coils 7 extend through the punched-out holes or apertures 6 in the carrier element 2 and are soldered to the conducting paths 10. Provided that identical materials (plastics) are used, the cover 4, 4' is connected to the frame 3 by ultrasonic welding or is locked to the frame, as mentioned hereinabove.

Concluding, a pressure control device is advantageously achieved which includes an integral lid, frame and cover assembly 1, 3, 4, 4' into which the carrier element 2 with the conducting paths 10 is injection-molded. Also, all apertures 6 and projections 8 or recesses can be made in one working operation during the manufacture of the lid. Closure of the frame 3 is possible either by a cover 4 that is retained on the frame 3 by integral plastic film hinges 15, or by a separate cover 4' which positively engages the frame of the lid 1 by locking hooks.

An unimpeded access to the carrier element 2 for equipment is always possible by using a frame and cover combination. Among other operations, this includes soldering the contact elements 5 to the conducting paths 10 by soldering robots as soon as the carrier element 2 is equipped with the copper foil on which the conducting paths 10 are formed (preferably manufactured by stamping) and the contact elements 5 of the coils 7 (valve pin connections) project from the funnel-shaped apertures 6 in the carrier element 2. The tab-shaped contacts of the plug 9, which is inserted laterally into the lid, are spread like forks and, thus, slide favorably on the conducting path 10 stamped on the projection 8 of the carrier element 2. This permits ease of access to almost all contact points from the top side of the lid and automatic manufacture (in conformity with the demands of automation).

LIST OF REFERENCE NUMERALS 1. lid
2. carrier element
3. frame
4. 4, 4' cover
5. contact element 6. aperture
7. coil
8. projection
9. plug
10. conducting path
11. offset
12. plug retainer
13. locking hooks
14. valve accommodating member
15. foil hinge
16. valve dome

I claim:

1. An electrohydraulic pressure control device of the type used in a brake controller or a traction slip controller, comprising:

a plurality of electromagnetically operable hydraulic valves mounted on a valve accommodating member;

a plurality of coils projected from the valve accommodating member, the coils having electrical contact elements extending therefrom opposite the valve accommodating member;

a lid covering the projection coils of the contact elements, the lid including
      a frame formed of plastic and circumscribing the coils and defining a chamber,
      a carrier element formed of plastic integral with the frame and dividing the chamber into an upper portion and a lower portion, the frame and the carrier together enclosing the coils in the lower portion and the carrier element having a plurality of apertures receiving the contact elements,
      a conducting element fixed to the carrier element and having a plurality of apertures aligned with the apertures of the carrier element receiving the contact elements which extend therethrough and the conducting element having a surface exposed in the upper chamber enabling access to the conduct element and the contact element, thereby facilitating electrically connecting the contact elements with the conducting element, and
      a cover configured to fit over the upper portion of the chamber and disposed thereover to seal the chamber, thereby preventing contamination of the chamber.

2. An electrohydraulic pressure control device as claimed in claim 1, wherein the carrier element has a recess formed as a projection substantially aligned with the carrier to which the electric plug can be attached which electrically connects to the conductor.

3. An electrohydraulic pressure control device as claimed in claim 1, wherein the cover is positively engaged in the frame and closes the carrier element.

4. An electrohydraulic pressure control device as claimed in claim 1, wherein the conducting element is at least partly embedded in the carrier for retention therein.

* * * * *